US012746101B2

(12) United States Patent
Sireix et al.

(10) Patent No.: US 12,746,101 B2
(45) Date of Patent: Sep. 29, 2026

(54) METHOD FOR MANUFACTURING A DENTAL PROSTHESIS AND SHELL MOULD CONFIGURED TO CARRY OUT THE METHOD

(71) Applicant: CIRCLE ANATOSCOPE INTUITIVE DESIGN, Salon de Provence (FR)

(72) Inventors: Christophe Sireix, Bogeve (FR); Alexandre Forest, Bellegarde (FR); Sébastien Lenoir, Marseilles (FR)

(73) Assignee: CIRCLE ANATOSCOPE INTUITIVE DESIGN, Salon de Provence (FR)

( * ) Notice: Subject to any disclaimer, the term of this patent is extended or adjusted under 35 U.S.C. 154(b) by 442 days.

(21) Appl. No.: 18/551,470

(22) PCT Filed: Mar. 24, 2022

(86) PCT No.: PCT/FR2022/050551

§ 371 (c)(1),
(2) Date: Sep. 20, 2023

(87) PCT Pub. No.: WO2022/200741

PCT Pub. Date: Sep. 29, 2022

(65) Prior Publication Data

US 2024/0164877 A1 May 23, 2024

(30) Foreign Application Priority Data

Mar. 25, 2021 (FR) ....................................... 2103049

(51) Int. Cl.
*A61C 13/00* (2006.01)
*A61C 13/01* (2006.01)
(Continued)

(52) U.S. Cl.
CPC ...... *A61C 13/0004* (2013.01); *A61C 13/0013* (2013.01); *A61C 13/04* (2013.01);
(Continued)

(58) Field of Classification Search
CPC . A61C 13/0004; A61C 13/04; A61C 13/1016; A61C 13/206; A61C 13/0013; B33Y 80/00
See application file for complete search history.

(56) References Cited

U.S. PATENT DOCUMENTS

| | | | |
|---|---|---|---|
| 2,107,181 | A | 2/1938 | Guyton |
| 2,171,736 | A | 9/1939 | Ballard |

(Continued)

FOREIGN PATENT DOCUMENTS

| | | | |
|---|---|---|---|
| DE | 10241857 | A1 | 4/2003 |

OTHER PUBLICATIONS

International Search Report for PCT/FR2022/050551 mailed Jun. 20, 2022, 6 pages.

(Continued)

*Primary Examiner* — Yogesh P Patel
(74) *Attorney, Agent, or Firm* — NIXON & VANDERHYE

(57) ABSTRACT

Disclosed is a method for manufacturing a dental prosthesis, including a step of digitally designing a dental prosthesis model from a replica model of a patient's teeth, a step of generating a jaw portion model including the teeth replica model and the dental prosthesis model, a step of manufacturing a jaw portion including a positioning member based on the model of the jaw portion, and a step of positioning the jaw portion on a shell of a shell mold by the interaction of the positioning member of the jaw portion with a complementary positioning member arranged in the shell. Also disclosed is a shell mold used in such a method.

12 Claims, 12 Drawing Sheets

(51) Int. Cl.
*A61C 13/20* (2006.01)
*A61C 13/36* (2006.01)
*B33Y 80/00* (2015.01)

(52) U.S. Cl.
CPC ........ *A61C 13/1016* (2013.01); *A61C 13/206* (2013.01); *B33Y 80/00* (2014.12)

(56) References Cited

U.S. PATENT DOCUMENTS

| | | | | |
|---|---|---|---|---|
| 2014/0272787 | A1 | 9/2014 | Ginsburg et al. | |
| 2015/0250568 | A1* | 9/2015 | Fisker | A61C 13/081 433/29 |
| 2016/0100917 | A1* | 4/2016 | Howe | A61C 13/0004 264/16 |
| 2020/0146791 | A1 | 5/2020 | Schülke et al. | |

OTHER PUBLICATIONS

Written Opinion of the ISA for PCT/FR2022/050551 mailed Jun. 20, 2022, 8 pages.

* cited by examiner

METHOD FOR MANUFACTURING A DENTAL PROSTHESIS AND SHELL MOULD CONFIGURED TO CARRY OUT THE METHOD

CROSS-REFERENCE TO RELATED APPLICATIONS

This application is the US national stage of PCT/FR2022/050551, filed Mar. 24, 2022 and designating the United States, which claims the priority of FR 2103049, filed Mar. 25, 2021. The entire contents of each foregoing application are incorporated herein by reference.

BACKGROUND OF THE INVENTION

Field of the Invention

The present invention relates to a method for manufacturing a dental prosthesis, for example a removable dental prosthesis, complete or partial (more commonly called "stellite").

It also relates to a shell mould configured to carry out such a method.

Description of the Related Art

A dental prosthesis designates here an apparatus for replacing at least some of the natural teeth.

A removable dental prosthesis is a prosthesis that can be removed from the mouth for example for its daily maintenance or to sleep.

A "complete" dental prosthesis, also called dentures, designates a prosthesis that replaces all of the teeth, whether of the upper jaw for an upper denture or of the lower jaw for a lower denture.

A "partial" dental prosthesis is used when only one tooth, or some of the teeth, but not the totality, must be replaced.

A partial prosthesis thus conventionally comprises a metal chassis, or stellite, used to support artificial teeth that are positioned at the location of the missing teeth. This metal chassis (usually containing chromium-cobalt-molybdenum), rigid, bears both on the remaining teeth and on the mucosa, mainly the gums.

A dental prosthesis can also be maintained in place in the mouth by at least one implant. An implant is a metal element, possibly fastened via a screw, in the bone, in order to replace the tooth root of a tooth.

The manufacturing of dental prostheses requires the implementation of a protocol comprising a succession of high-precision steps, among which a step called flasking. This step involves taking the imprint of a prosthesis model made of wax, in a mould made of two separatable parts, called flask. The model is made manually by a prosthetist and includes artificial teeth disposed one after the other on the model.

In some cases, the taking of an imprint is carried out by casting plaster inside the flask. When the plaster is solidified, the flask is scalded and the wax, by melting, is eliminated and leaves an imprint in the plaster. A cooling of the mould made of plaster is necessary before casting a material, generally a resin, in the imprint in which artificial teeth have previously been disposed.

In other cases, the taking of an imprint is carried out by pouring a gel inside the flask. When the gel is solidified, the model made of wax can then be removed manually without a scalding phase. However, the artificial teeth must be separated from the model made of wax before being positioned in the imprint formed by the gel. Moreover, the artificial teeth are generally scalded in order to eliminate the wax residues.

This flasking step, in particular the substeps of solidification of the plaster, of scalding the flask, of cooling or of separation of the artificial teeth from the model made of wax are time-consuming and considerably delay the effective creation of the prosthesis.

SUMMARY OF THE INVENTION

The present invention thus aims to overcome, at least partly, these disadvantages.

It aims in particular to propose a method allowing to save time and increase the ease of manufacturing of a dental prosthesis.

For this purpose, the invention relates, according to a first aspect, to a method for manufacturing a dental prosthesis including:

- a step of digitally designing a dental prosthesis model to be made from a replica model of a patient's teeth;
- a step of generating a jaw portion model including the teeth replica model and the dental prosthesis model assembled to the teeth replica model;
- a step of digitally designing a positioning member model in the teeth replica model;
- a step of manufacturing the jaw portion including a positioning member on the basis of the jaw portion model including a positioning member model;
- a step of manufacturing the teeth replica including a positioning member on the basis of the teeth replica model including the positioning member model;
- a step of positioning the jaw portion on a shell of a shell mould by interaction of the positioning member of the jaw portion with a complementary positioning member arranged in said shell;
- a step of closing the shell mould;
- a step of creating an imprint of the jaw portion by injection of a material into the shell mould;
- a step of positioning at least one artificial tooth in the imprint of the jaw portion;
- a step of positioning the teeth replica on the shell of the shell mould by interaction of the positioning member of the teeth replica with the complementary positioning member of the shell;
- a step of positioning the teeth replica in the imprint in which the at least one artificial tooth is positioned; and
- a step of casting a filling material in a residual volume defined by the imprint, the at least one artificial tooth and the teeth replica.

Such method for manufacturing a dental prosthesis according to the invention thus allows a possible saving of time by avoiding steps such as the scalding and the cooling of the flask.

Indeed, the prosthesis model made of wax is substituted here by a jaw portion manufactured from a digitally designed model.

In practice, the jaw portion is manufactured in a single piece.

Therefore, no artificial tooth needs to be removed or scalded since the jaw portion is in one piece and is not necessarily reused in the rest of the method, which allows to position the artificial teeth directly after the taking of an imprint and to abstain from the usual steps of scalding or of recovering the artificial teeth.

Moreover, a material forming the jaw portion can then be recycled to allow the manufacturing of other dental prostheses or of other products. The same applies to the material forming the teeth replica, which can be manufactured in the same manner as the jaw portion.

In an exemplary embodiment, the step of manufacturing the jaw portion and the step of manufacturing the teeth replica are carried out simultaneously.

Thus, the time of production of the prosthesis can be shortened.

A method according to the invention thus allows to easily and quickly obtain a dental prosthesis made on a case-by-case basis, that is to say made to order.

Moreover, the use of a replica of a patient's teeth for the manufacturing of the prosthesis, and more precisely during the step of casting a filling material, allows to obtain a more precise match between the prosthesis and the environment into which it is intended to be inserted than the usual methods.

The presence of a positioning member on the teeth replica, and thereby on the jaw portion, allows a more precise positioning of these two elements on the shell of the shell mould via the complementary positioning member. This thus allows to position the teeth replica more precisely inside the imprint of the jaw portion.

The positioning member is also used, in particular when it interacts with the complementary positioning member, to maintain the jaw portion or the teeth replica in place on the shell of the shell mould. Such a positioning member is for example formed on a lower portion of the teeth replica.

According to a preferred example, the positioning member interacts according to a sliding link with the complementary positioning member arranged on the shell.

For example, the interaction between the positioning member and the complementary positioning member can form a dovetail assembly.

In this way, the movement of the jaw portion or of the teeth replica with respect to the shell is limited to translation according to a single axis defined by the sliding link. It is thus possible to adjust the position in translation according to the axis defined by the sliding link of at least one out of the jaw portion or the teeth replica.

According to another preferred example, the positioning member includes a groove configured to interact with the complementary positioning member.

According to another preferred example, the complementary positioning member includes a tab configured to interact with the positioning member.

The groove can have a polygonal cross-section and be configured to form a female portion of a dovetail assembly by interaction with the complementary positioning member.

Likewise, the tab can have a cross-section configured to form a male portion of the dovetail assembly by interaction with the positioning member. The tab has for example a polygonal cross-section.

According to an option of interest, the complementary positioning member further includes an axial stop.

For example, this axial stop can allow a stopping in translation of the jaw portion or of the teeth replica when the positioning member interacts with the complementary positioning member according to the sliding link. Thus, the axial stop forms a reference for positioning the jaw portion and/or the teeth replica with respect to the shell. Indeed, it is possible to immobilise the jaw portion and/or the teeth replica in a predetermined position by sliding it along the axis defined by the sliding link until the axial stop.

Thus the positioning of the jaw portion on the shell is carried out easily and quickly by a prosthetist or any other practitioner, by translating the jaw portion until the stop. Moreover, it is thus possible to identically position the teeth replica on the shell by doing the same.

In exemplary the of an embodiment, step manufacturing the teeth replica is preceded by a step of parallelisation of the teeth replica model, in which undercut zones of the teeth replica model are filled in digitally.

These undercut zones are typically located at the junction between the teeth and the gums.

In the methods of the prior art, it was necessary to manually fill in these undercut zones with wax.

Consequently, the creation step is configured to minimise, or even eliminate, the undercut zones of the teeth replica model.

Thus, this step, carried out digitally, then allows to manufacture the teeth replica in which the "parallelised" zones are formed in a single piece with the teeth replica.

This is particularly advantageous during the step of creating the imprint in order to remove the jaw portion from the mould without damaging the imprint.

Moreover, the undercut zones are possibly filled in according to an axis of insertion determined digitally. The axis of insertion corresponds to the direction according to which the prosthesis will be inserted into the mouth of the patient. The axis of insertion is generally determined by the practitioner, or by a piece of software.

According to a specific exemplary embodiment, the step of positioning the imprint on the teeth replica is preceded by a step of positioning a stellite chassis on the teeth replica.

A stellite chassis is particularly useful in the case of a partial prosthesis, typically to maintain together two separate parts of the prosthesis.

Advantageously, the stellite chassis is rigidly connected to the dental prosthesis after the casting of the filling material.

Putting the stellite chassis in place is thus easy and quick for a practitioner and guarantees an optimal adaptation to the environment in which it is intended to be positioned.

According to another exemplary embodiment, the method further includes a step of piercing a supply channel opening into the imprint.

This supply channel is used thereafter for the casting of the filling material to create the dental prosthesis. In an example of interest, at least two channels are pierced in order to simultaneously allow the casting of the filling material and the evacuation of air present in the imprint.

According to an exemplary embodiment, the step of manufacturing the jaw portion and/or the teeth replica is carried out by additive manufacturing.

According to the invention, "additive manufacturing" designates a manufacturing method of adding material, most of the time assisted by computer, more commonly called "3D Printing". The techniques of additive manufacturing allow for example a more precise manufacturing of the jaw portion.

Thus, it is possible to abstain from the manual manufacturing of a model made of wax.

Moreover, via the precision of the additive manufacturing, it can be possible to eliminate the need for a polishing step which is often time-consuming and costly and capable of damaging the part.

Thus, at least in certain cases, a dental prosthesis to be made can exit directly ready for the use of such a method, or with only a minimum of post-treatment steps, for example to obtain a polished-mirror appearance on some surfaces of the dental prosthesis.

According to an exemplary embodiment, the step of manufacturing the jaw portion and/or the teeth replica is carried out according to a method comprising a succession of additions of material by jets on a printing support, in successive layers, the material being solidified by photopolymerisation after each jet.

For example the jaw portion can be manufactured from a monomer, a polymer or a photopolymerisable resin. Preferably, the jaw portion is manufactured from PA 12 (for polyamide 12, also called Nylon 12).

Indeed, PA 12 has capabilities of interest of recycling the non-melted powder after the implementation of the additive manufacturing method as described here, and thus allows to reuse this powder in order to create other prostheses or even other products.

According to another aspect, a shell mould for manufacturing a dental prosthesis is also proposed.

According to the invention, the shell mould includes a complementary positioning member configured to interact with a positioning member of an insert to be positioned in the shell mould.

Such a mould is thus in particular configured to implement a method as described above.

In the context of the invention, a “shell mould” designates a mould formed by at least two portions interacting with each other, each portion thus being called “shell”.

An insert corresponds here to any part allowing to implement at least some of the steps of taking an imprint, moulding or overmoulding with a view to creating a dental prosthesis. For example, according to the invention, the insert can be a replica of a patient’s teeth or a jaw portion.

Such a shell mould thus has advantages analogous to those described above in relation to the method.

According to one embodiment, the complementary positioning member is configured to form a sliding link with the positioning member of the insert.

In particular, the complementary positioning member is for example configured to form a male part of the dovetail assembly.

According to one embodiment, the complementary positioning member includes a tab configured to interact with the positioning member.

According to a complementary embodiment, the complementary positioning member includes an axial stop to block the movement in translation of the positioning member when it interacts with the complementary positioning member.

In particular, the axial stop can be formed by a protruding surface, protruding transversely to the longitudinal direction of the tab acting as a guide in translation, for example perpendicularly on either side of the tab, so that the complementary positioning member has the shape of a T.

BRIEF DESCRIPTION OF THE DRAWINGS

The invention, according to an exemplary embodiment, will be well understood and its advantages will be clearer upon reading the following detailed description, given for informational and in no way limiting purposes, in reference to the appended drawings in which.

DETAILED DESCRIPTION

The identical elements shown in the aforementioned drawings are identified by identical numerical references.

Figure 1:
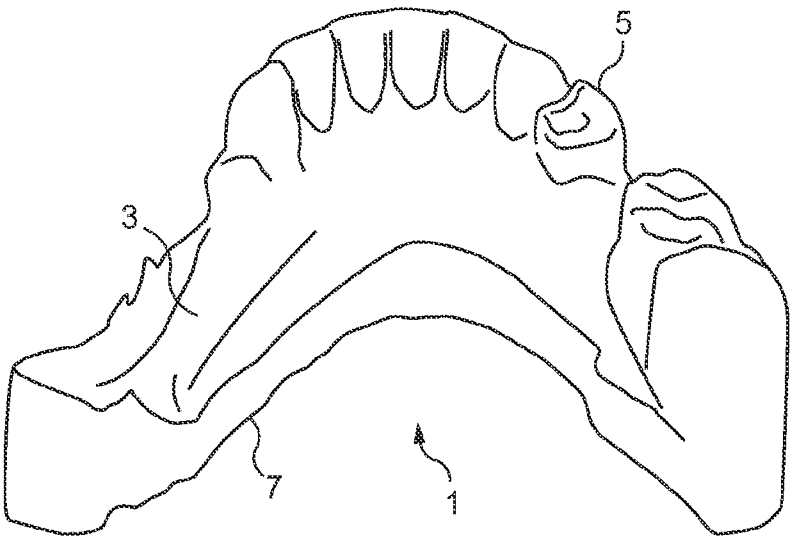
FIG. 1 shows an example of a replica model of a patient’s teeth according to an embodiment of the invention.

FIG. 1 shows a replica model of a patient’s teeth 1.

Such a model is for example obtained via a step of taking a digital imprint (not illustrated) carried out on a model made of plaster via a table scanner or, preferably, directly via an intraoral scanner in the mouth of the patient.

The teeth replica model 1 thus corresponds to a digital representation of a portion of the jaw of a patient, in this case a lower jaw portion, for which a dental prosthesis must be made.

This teeth replica model 1 is generally stored in a file in the STL format and displayed using a piece of computer-aided design software.

The teeth replica model 1 includes for example an “upper” portion mainly forming a teeth portion, and a “lower” portion mainly forming a gums portion.

The teeth replica model 1 further includes a rear portion, or lingual portion, representing a concave inner face.

In the example illustrated, the teeth replica model 1 includes, in the upper portion, at least one missing tooth 3.

Moreover, in the example illustrated, the teeth replica model 1 includes at least one remaining tooth 5. The dental prosthesis to be made is in this case a partial dental prosthesis.

Of course, the present invention is not limited to this type of dental prosthesis and also applies to other types of prostheses, for example, to a complete dental prosthesis, that is to say for which the teeth replica model does not include any tooth 5.

Figure 2B:
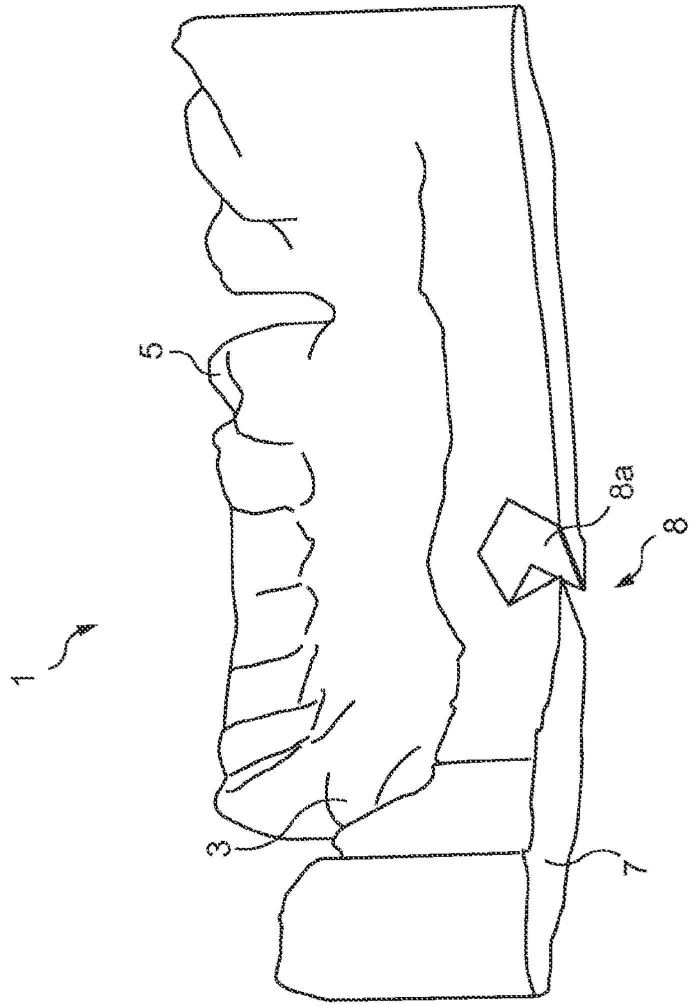
FIG. 2B shows a rear view, substantially low-angle, of the teeth replica model of FIG. 2A.
Figure 2A:
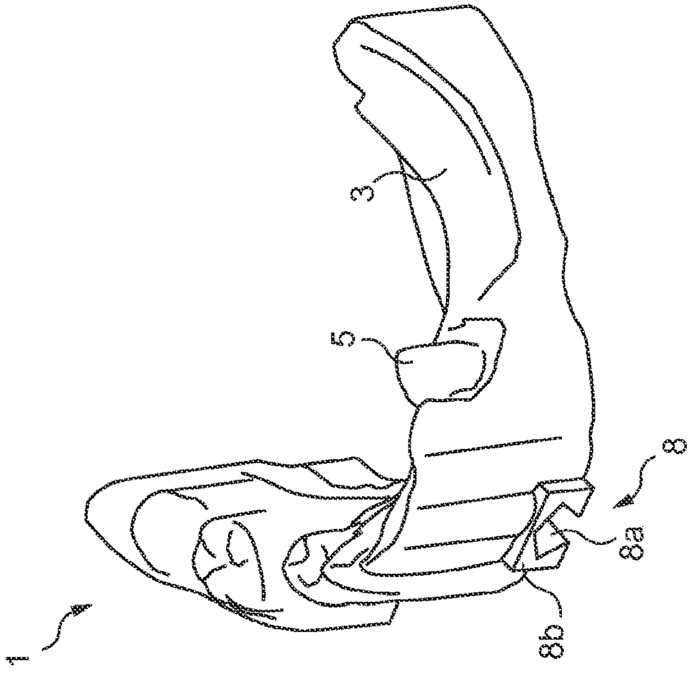
FIG. 2A shows a front high-angle view of the example of a replica model of a patient’s teeth of FIG. 1, with a positioning member.

As illustrated in FIGS. 2A and 2B, the teeth replica model 1 also includes a front portion, representing a convex outer face. The front portion is thus opposite to the rear portion, and the distance separating them forms the thickness of the teeth replica model 1.

The teeth replica model 1 further includes in the lower portion a lower surface 7.

This surface, once the teeth replica model 1 has been manufactured, is configured to position it in a stable manner on a support.

The lower surface 7 of the lower portion of the teeth replica model 1 defines for example a plane.

FIGS. 2A and 2B also show a positioning member model 8, arranged in the teeth replica model 1, at its lower portion. In particular, the positioning member model 8 is arranged starting from the lower surface 7 of the teeth replica model 1.

In the example shown, the positioning member model 8 includes a groove 8*a*. The groove 8*a* is configured to form a sliding link with a complementary member.

Indeed, the groove 8*a* extends according to a longitudinal axis between the rear portion and the front portion of the teeth replica model 1. The groove 8*a* has here a trapezoidal cross-section that allows, by interaction with a complementary member, only the movement according to a longitudinal axis of the groove 8*a*.

In the example shown in FIGS. 2A and 2B, the groove 8*a* is hollowed out starting from the lower surface 7 of the teeth replica model 1. The groove 8*a* extends parallel to the plane defined by the lower surface 7, over at least a portion of the thickness of the teeth replica model 1. In FIG. 2B for example, the groove 8*a* extends from the rear portion to the front portion of the teeth replica model 1, that is to say over the totality of the thickness of the teeth replica model 1. In other words, the groove 8*a* passes all the way through. In the present exemplary embodiment, the positioning member model 8 also includes a stop element or stop 8*b* configured to stop the movement in translation of the teeth replica model 1. According to an option of interest, the stop is formed by the front portion of the teeth replica model 1. In the present exemplary embodiment, the stop 8*b* includes a protrusion extending from the front portion of the teeth replica model 1. The protrusion of the stop 8*b* includes a flat surface, perpendicular to the longitudinal axis of the groove 8*a*.

Figure 3B:
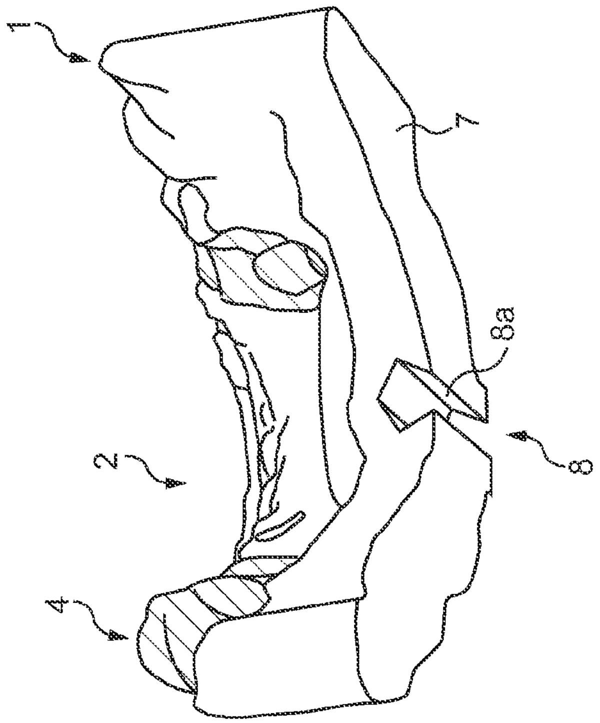
FIG. 3B shows a rear view, substantially low-angle, of the example of a model of a jaw portion of FIG. 3A.
Figure 3A:
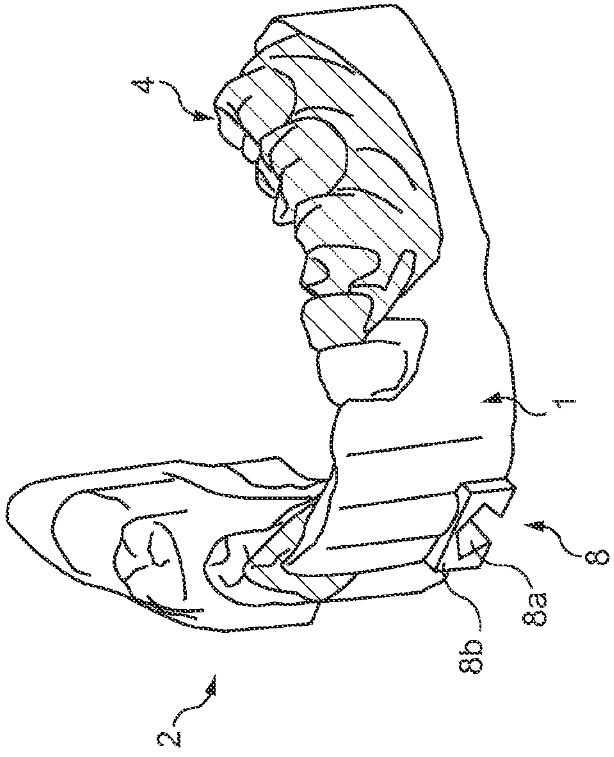
FIG. 3A shows an example of a model of a jaw portion, from a high angle, as obtained from the example of a teeth replica of FIGS. 2A and 2B, according to an embodiment of the invention.

FIG. 3A and FIG. 3B show a jaw portion model 2 comprising the teeth replica model 1 illustrated in FIGS. 2A and 2B and a dental prosthesis model 4, shown hatched, assembled by digital design to the teeth replica model 1.

The dental prosthesis model 4 is designed digitally on the basis of the teeth replica model 1. A profile and a shape of the prosthesis model are determined according to the teeth replica model 1 in order to best adapt to it. The profile of the dental prosthesis model 4 is also determined according to an axis of insertion, that is to say the trajectory for inserting the dental prosthesis model by simulation into the mouth of the patient. This axis of insertion is for example determined by the prosthetist or by the software.

Therefore, the dental prosthesis model 4 typically includes at least one tooth, and optionally a gum portion according to the teeth replica model 1, so as to form a jaw portion model 2 with corrected and complete teeth.

In the case of a partial dental prosthesis, the dental prosthesis model 4 can include a stellite chassis model (not shown) configured to bear on at least one remaining tooth 5 and/or on a mucosa, in particular the gums, and/or to maintain together at least two separate parts of the dental prosthesis model.

It is understood that a lower portion of the jaw portion model 2 corresponds entirely to the lower portion of the teeth replica model 1. Indeed, only the hatched portion shown on the jaw portion model 2 differs from the teeth replica model 1. Thus, the jaw portion model 2 also includes the lower surface 7 at its lower portion. Consequently, the jaw portion model 2 also comprises the positioning member model 8, including here the groove 8*a* and the stop 8*b*, identical to the positioning member of the teeth replica model 1.

Figure 4:
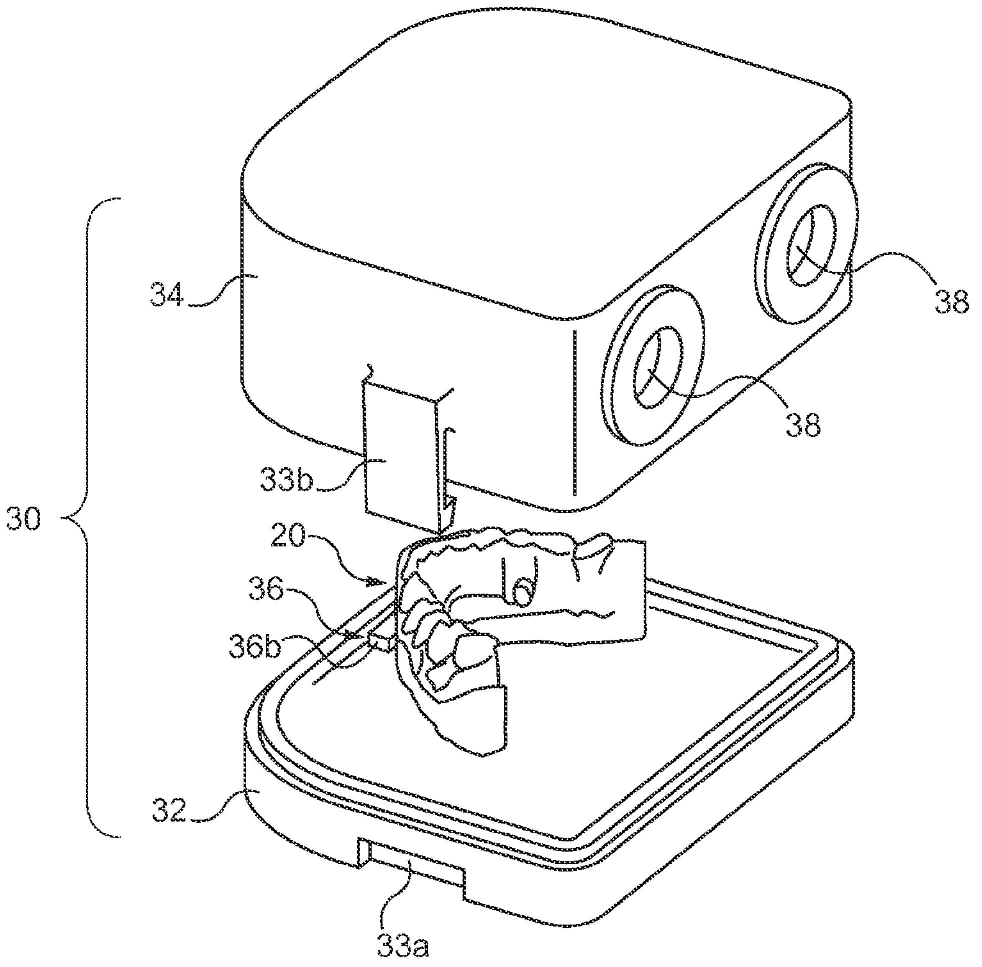
FIG. 4 shows a positioning of a jaw portion, carried out using the model of a jaw portion of FIGS. 3A and 3B, on a shell of a shell mould, according to an exemplary embodiment of the invention.

FIG. 4 illustrates a step of positioning of the jaw portion 20 on a shell 32 of a shell mould 30. The shell mould 30 includes here two shells: the shell 32 and a complementary shell 34 that is configured to interact with the shell 32 to close the shell mould 30.

For this, the shell 32 and the complementary shell 34 respectively include a notch 33*a* and a hook 33*b*. The hook 33*b* is configured to interact with the notch 33*a* to maintain the shell mould 30 closed. Of course, any other means for closing the shell mould 30 is possible, for example such as rubber bands.

The shell 32 has a bottom 35. The bottom 35 defines here a flat surface. The flat surface formed by the bottom 35 is intended to receive the jaw portion 20 on its lower surface 7 side.

According to the example shown, casting holes 38 are arranged in the complementary shell 34 in order to fill the shell mould 30 with a material with a view to the creation of an imprint of an insert.

The material for creating the imprint is a hydrocolloidal gel.

Such a shell mould 30 forms for example a dental flask.

FIG. 4 also shows an exemplary embodiment of a jaw portion 20, made from the jaw portion model 2 shown in FIGS. 3A and 3B.

The jaw portion 20 is for example made by additive manufacturing. For example, the jaw portion 20 is made from PA 12, or from photopolymerisable resin. In the exemplary embodiment described here, the jaw portion 20 is manufactured in a single piece.

The step of manufacturing the jaw portion 20 can further include, for example, a finishing substep. However, the parts made by additive manufacturing generally only require very few, or no, finishing touches; such a finishing step is therefore optional.

According to an aspect of interest of the invention, the shell 32 includes a complementary positioning member 36.

The complementary positioning member 36 of the shell 32 is configured to interact with a positioning member arranged in an insert, the overmoulding of which is to be carried out, in particular to form a sliding link. In the exemplary embodiment shown, the complementary positioning member 36 forms the male portion of a dovetail assembly.

In the present exemplary embodiment, the complementary positioning member 36 comprises an axial stop 36*b* to stop the movement in translation of the jaw portion 20 during the interaction of the complementary positioning member 36 with the positioning member 28. In general in the present description, an "insert" thus designates an object intended to be inserted into a mould to be overmoulded.

In the context of the present example, the insert in question is therefore the jaw portion 20.

Figure 5:
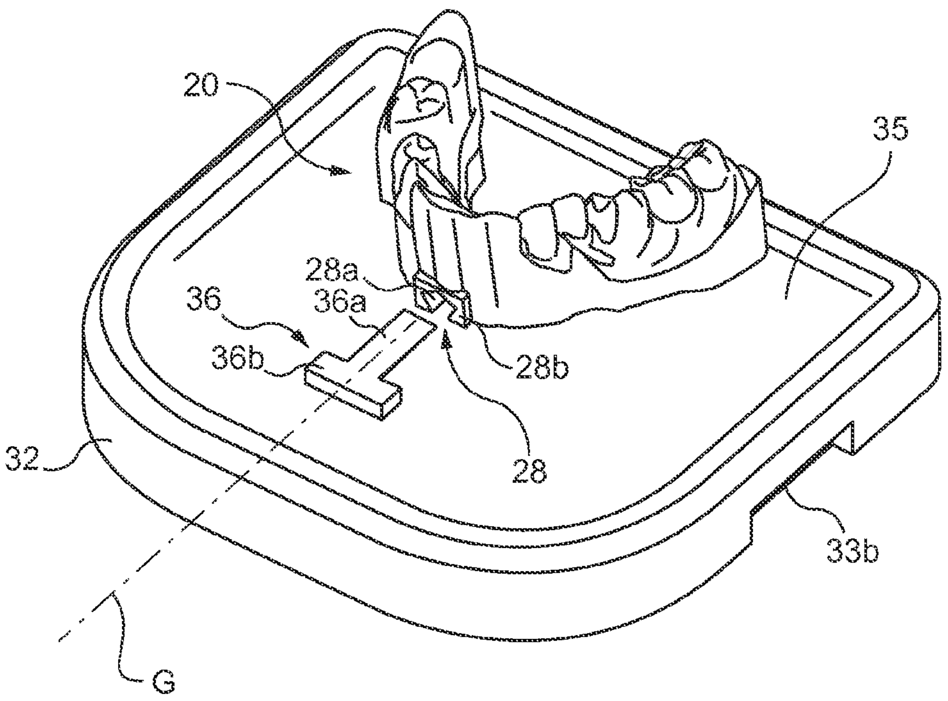
FIG. 5 illustrates, by a perspective view, a step of closing the shell mould with the jaw portion positioned on one of the shells, as illustrated in FIG. 4.

As shown by FIG. 5, the jaw portion 20 includes a positioning member 28. The positioning member 28 is made from the positioning member model 8. In this case, the positioning member 28 includes here a groove 28*a*. According to the example shown, the positioning member 28 also includes a stop 28*b* formed at the front portion of the jaw portion 20.

The complementary positioning member 36 of the shell 32 is therefore configured to interact with the positioning member 28 of the jaw portion 20.

The complementary positioning member 36 is located on the bottom 35 of the shell 32. In particular, the complementary positioning member 36 protrudes from the bottom 35 of the shell 32.

According to the example shown, the complementary positioning member 36 comprises here a tab 36*a*, which has a shape complementary to that of the groove 28*a*. The tab 36*a* has for example a cross-section complementary to the cross-section of the groove 28*a*.

The tab 36*a* protrudes from the bottom 35 of the shell 32. The tab extends longitudinally according to the axis G shown in FIG. 5. The longitudinal axis G of the tab 36*a* is parallel to the flat surface formed by the bottom 35 of the shell 32 so that the movement of translation obtained during the interaction between the tab 36*a* and the groove 28*a* is carried out parallel to the flat surface formed by the bottom 35 of the shell 32.

Thus, during the interaction the between positioning member 28 and the complementary positioning member 36, the jaw portion 20 is moved parallel to the flat surface of the bottom 35 of the shell 32.

In the exemplary embodiment shown, the groove 28*a* forms the female portion of a dovetail assembly. The groove 28*a* includes for example a polygonal, and more precisely trapezoidal, cross-section. In the exemplary embodiment shown, the tab 36*a* forms the male portion of a dovetail assembly.

The dovetail assembly is used here to prevent the movement of the jaw portion 20 in an out-of-plane direction, for example orthogonal to the flat surface of the bottom 35 of the shell 32, and to maintain in position the jaw portion 20 for example during the separation of the complementary shell 34 and the shell 32 after a step of creating an imprint described more in details below.

Of course, the groove 28*a* of the positioning member 28 and/or the tab 36*a* of the complementary positioning member 36 according to the invention can have any other shape as long as they allow an interaction according to a sliding link. Thus, in an embodiment not shown, the positioning member 28 includes a tab protruding with respect to the lower surface of the jaw portion and the complementary positioning member includes a groove having a cross-section complementary to the tab of the positioning member. According to the example shown, the axial stop 36*b* is configured to interact with the positioning member 28 and more particularly with the front portion of the jaw portion 20, optionally with the stop 28*b* of the positioning member 28. This axial stop 36*b* also forms a reference for positioning of the jaw portion 20 on the shell 32.

The axial stop 36*b* is formed by a protruding surface, extending perpendicularly on either side of the tab 36*a*, so that the complementary positioning member 36 has the shape of a T. The axial stop 36*b* is for example located at an end of the tab 36*a* so as to be able to visualise the bearing in abutment with an insert, such as the jaw portion 20 and in this case with the stop 28*b* of the positioning member 28.

Of course, the axial stop 36*b* of the complementary positioning member 36 is not limited to the example shown and can be formed by any other means allowing to stop the movement in translation of an insert. In an embodiment not shown, the groove 28*a* formed by the positioning member 28 does not pass all the way through and is stopped by a longitudinal end of the tab 36*a*.

Figure 6:
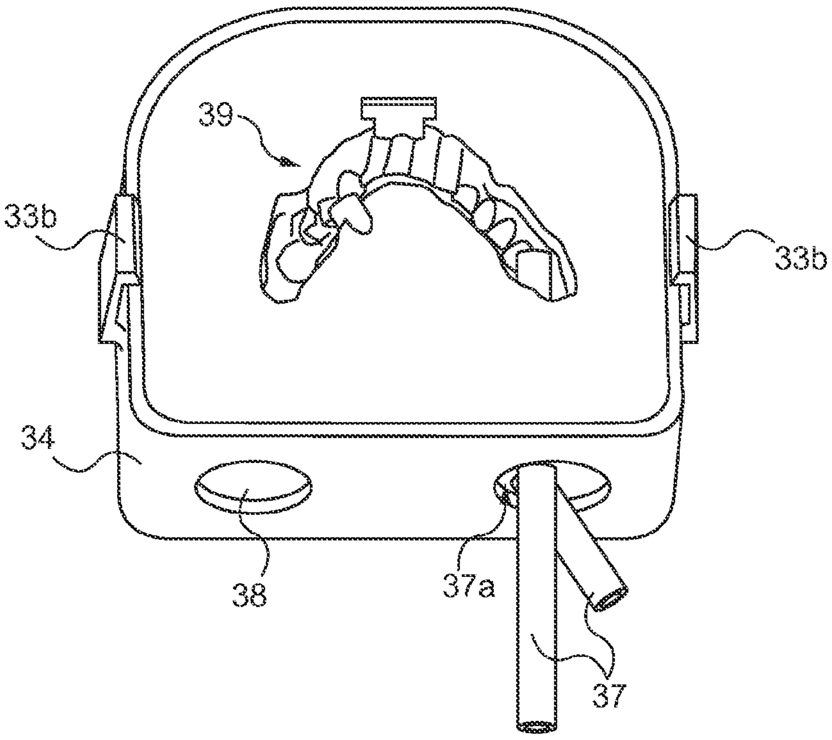
FIG. 6 shows an imprint of the jaw portion made in the shell mould and a step of forming a supply channel.

FIG. 6 illustrates the imprint 39 obtained after separation of the complementary shell 34 and the shell 32 carrying the jaw portion 20, that is to say when the shell mould 30 is open.

According to the example shown, the imprint 39 is formed from the material introduced by the casting holes 38. Thus, in the present example, the imprint 39 is integrally comprised in the complementary shell 34 of the shell mould 30.

As illustrated also in FIG. 6, the method includes a step of piercing a supply channel 37*a*, formed starting from at least one of the casting holes 38 of the complementary shell 34 and opening into the imprint 39. Such a supply channel 37*a* is for example made using a cannula 37*b*, for example a hollow cannula, inserted by one of the casting holes 38. In a non-limiting manner, the supply channel 37*a* preferably opens at a gums portion of the imprint 39.

Thus, such a method allows to create an imprint with a view to creating a custom dental prosthesis by moulding.

Figure 7:
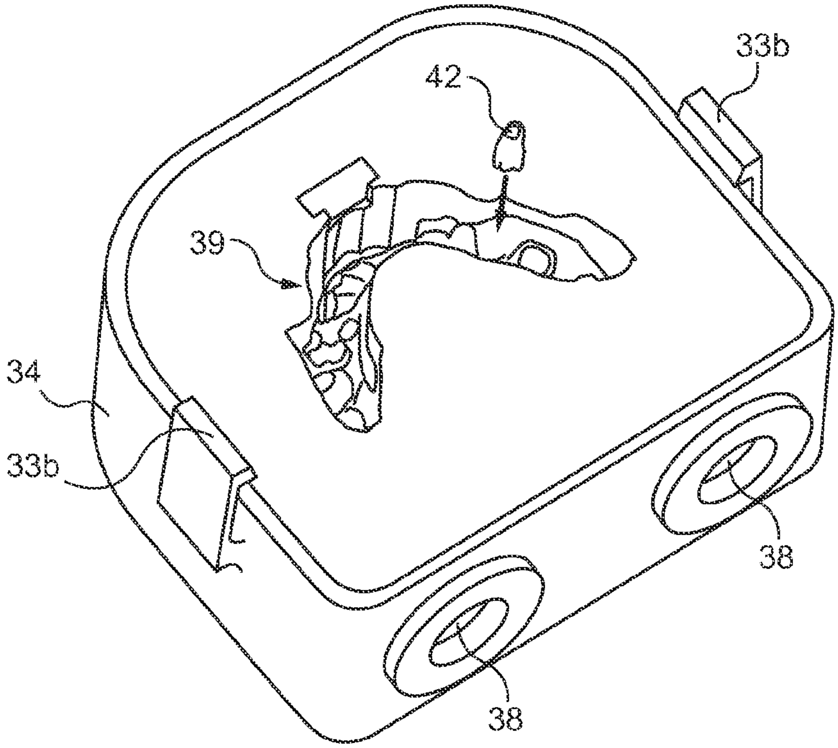
FIG. 7 shows a step of positioning an artificial tooth in the imprint of FIG. 6.

FIG. 7 illustrates a step of positioning at least one artificial tooth 42 in the imprint 39.

For example here, several artificial teeth 42 are positioned in the imprint 39. These teeth are intended to fill in the missing teeth, shown in the teeth replica model 1. Consequently, such artificial teeth 42 are positioned in the imprint 39, at the locations corresponding to the teeth previously designed by the software, as shown with hatching in FIGS. 3A and 3B for example.

Figure 8:
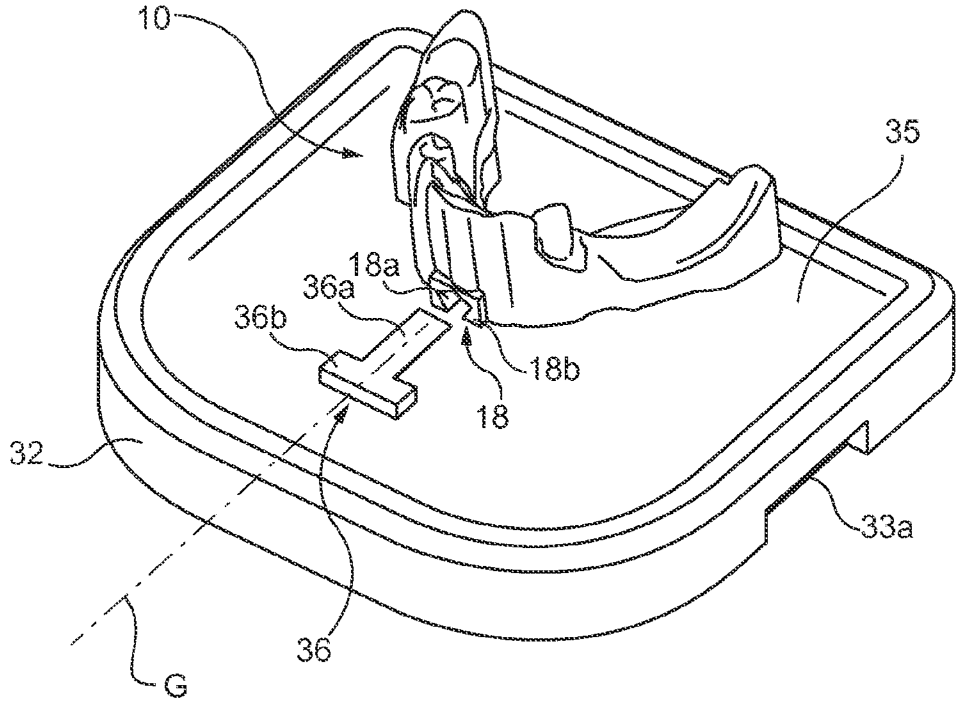
FIG. 8 shows a step of positioning a teeth replica, made from the teeth replica model of FIGS. 2A and 2B, on the shell of the shell mould of FIG. 4.

FIG. 8 shows a step of positioning a teeth replica 10 on the shell 32 of the shell mould 30, in an analogous manner to the step of positioning the jaw portion 20 on the shell 32.

For example, the teeth replica 10 is made by additive manufacturing, on the basis of the teeth replica model 1, in a manner analogous to the creation of the jaw portion 20.

The teeth replica 10 consequently includes a positioning member 18, identical to the positioning member 28 of the jaw portion 20.

In this case, the positioning member 18 includes here a groove 18*a*. According to the example shown, the positioning member 18 also includes a stop 18*b* formed by the front face of the jaw portion 20.

The complementary positioning member 36 of the shell 32 is thus configured to interact with the positioning member 18 of the teeth replica 10. In this way, the teeth replica 10 is positioned on the shell 32 in a similar, or even identical, way to the jaw portion 20. In particular, the complementary positioning member 36 is configured to form a sliding link, and more particularly a dovetail assembly, with the positioning member 18.

The sliding link allows here a movement in translation of the teeth replica 10 according to the longitudinal axis G of the tab 36*a*, that is to say parallel to the flat surface of the bottom 35 of the shell 32.

The dovetail assembly is used to prevent the movement of the teeth replica 10 in a direction perpendicular to the flat surface of the bottom 35 of the shell 32, and to maintain in position the teeth replica 10 for example during the separation of the complementary shell 34 and of the shell 32 after a step of casting of a filling material described in more detail below.

Figure 9:
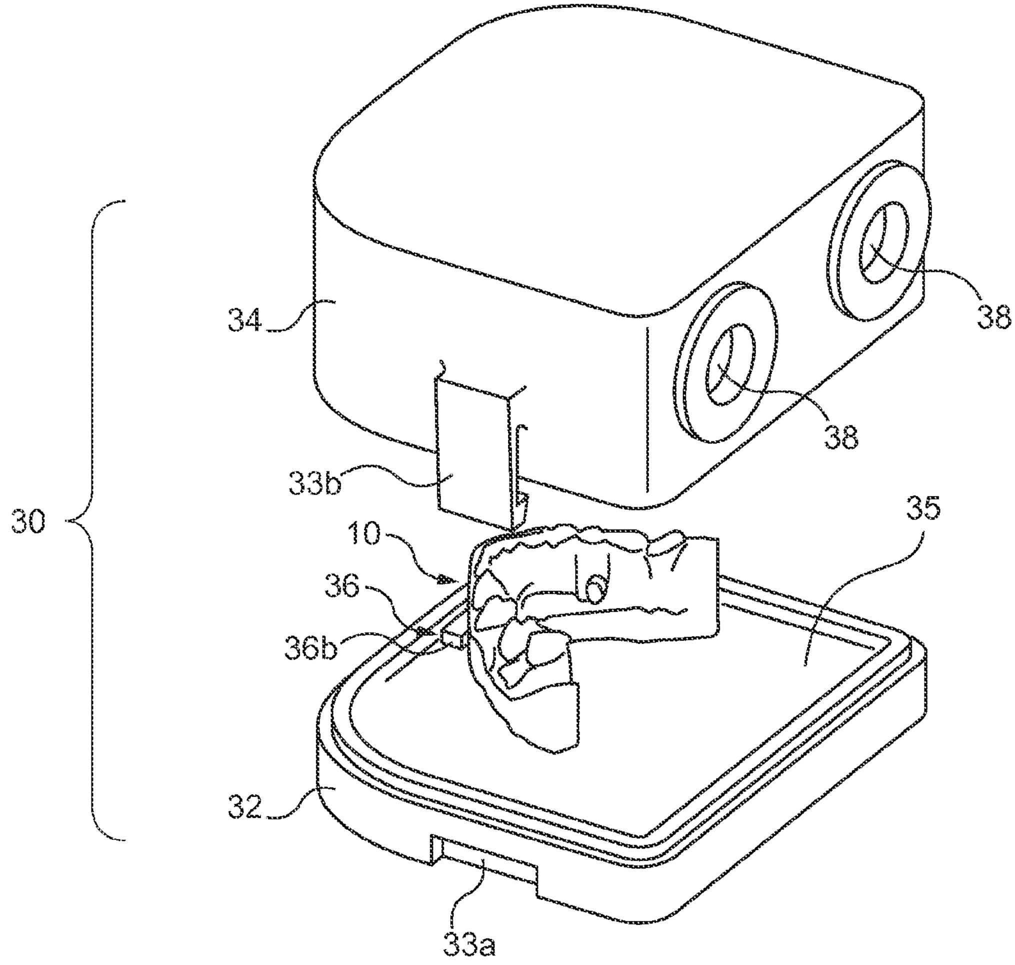
FIG. 9 illustrates by a perspective view a step of closing the shell mould with the teeth replica positioned on one of the shells as illustrated in FIG. 8.

FIG. 9 shows a step of positioning the teeth replica 10 in the imprint 39. For example, this step includes a step of closing the shell mould 30, by the interaction of the shell 32 and of the complementary shell 34, while the teeth replica 10 is positioned on the shell 32 and the imprint 39 is in the complementary shell 34.

The teeth replica 10 forms a sealed link with the imprint 39. This is explained in particular by the fact that the lower portion of the jaw portion 20 is identical to that of the teeth replica 10.

However, since their upper portion is different, the teeth replica 10 only partly fills the imprint 39, so as to form a residual volume in the imprint 39. This residual volume is both defined and delimited by the imprint 39, the artificial teeth 42 and the teeth replica 10.

In the case of a partial dental prosthesis, this volume is further defined by the stellite chassis 44 (FIG. 11), previously positioned on the teeth replica 10 before the closing of the shell mould 30.

Figure 10:
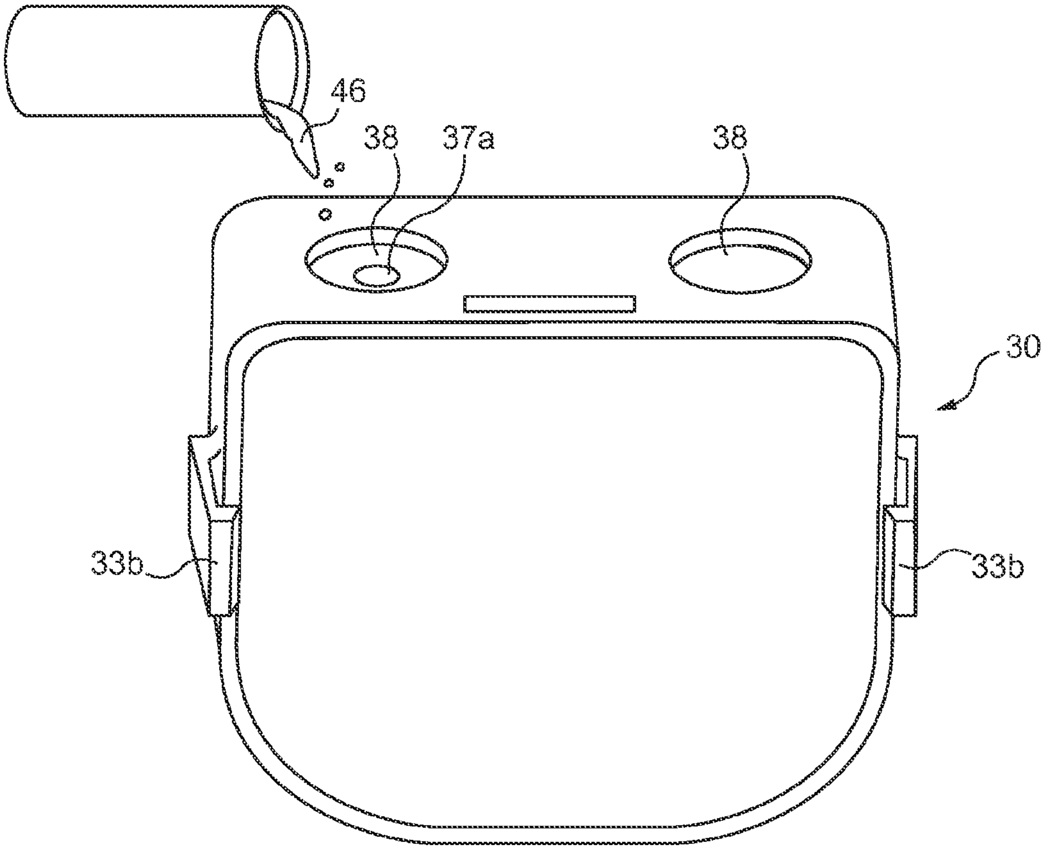
FIG. 10 shows a step of casting a filling material inside the closed shell mould, including the teeth replica as shown in FIGS. 8 and 9.

FIG. 10 illustrates a casting step in which a filling material 46 is introduced via at least one of the casting holes 38 into the residual volume defined between at least the teeth replica 10 and the imprint 39. In this case, in the example shown, the filling material 46 is introduced via the supply channel 37*a*.

During this step, the filling material 46 comes in contact with at least a portion of the artificial teeth 42 to bond thereto, for example, by overmoulding. The same applies for the stellite chassis 44 in the case of a partial prosthesis.

The filling material 46 can be injected under pressure or by natural gravitational filling, so as to best adjust to the walls of the residual volume. The filling material 46 can comprise any type of material known for the manufacturing of a dental prosthesis, such as an acrylic resin for example.

The method further includes a step of separating the teeth replica 10 and the imprint 39, or even for example of opening the shell mould 30, then a step of extracting (not illustrated) an unsurfaced blank configured to form the dental prosthesis.

The method also includes for example a finishing step which can include a step of eliminating an injection sprue corresponding to the moulding of the supply channel, and/or a finishing step involving for example a polishing and/or a deburring and/or a buffing of the unsurfaced blank.

Figure 11:
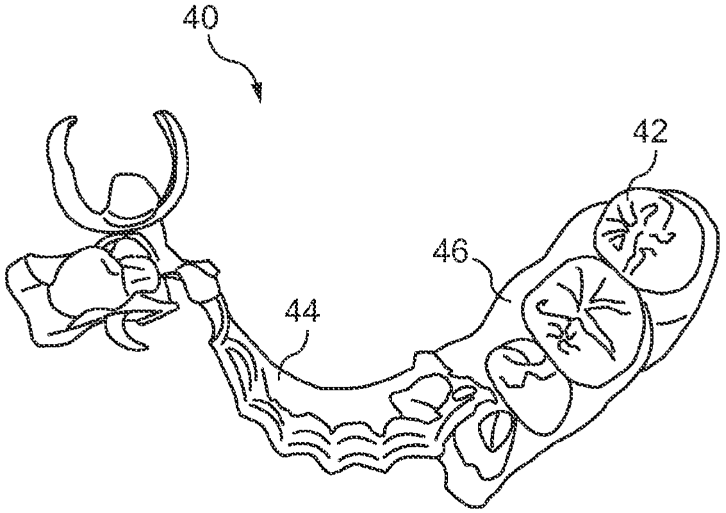
FIG. 11 shows a dental prosthesis obtained according to an exemplary embodiment of the invention.

FIG. 11 illustrates an example of a prosthesis 40 obtained after this method according to an exemplary embodiment. According to the example shown, the prosthesis 40 includes the artificial teeth 42 and the stellite chassis 44 which are bonded to the solidified filling material 46 forming a gum.

In the present exemplary embodiment, the dental prosthesis 40 is a partial dental prosthesis. Indeed, the stellite chassis 44 connects two portions each including at least one artificial tooth 42 bonded to the solidified filling material 46.

Adjustment steps can be carried out by positioning the dental prosthesis 40 on the teeth replica 10, before being inserted into the mouth of the patient.

Figure 12:
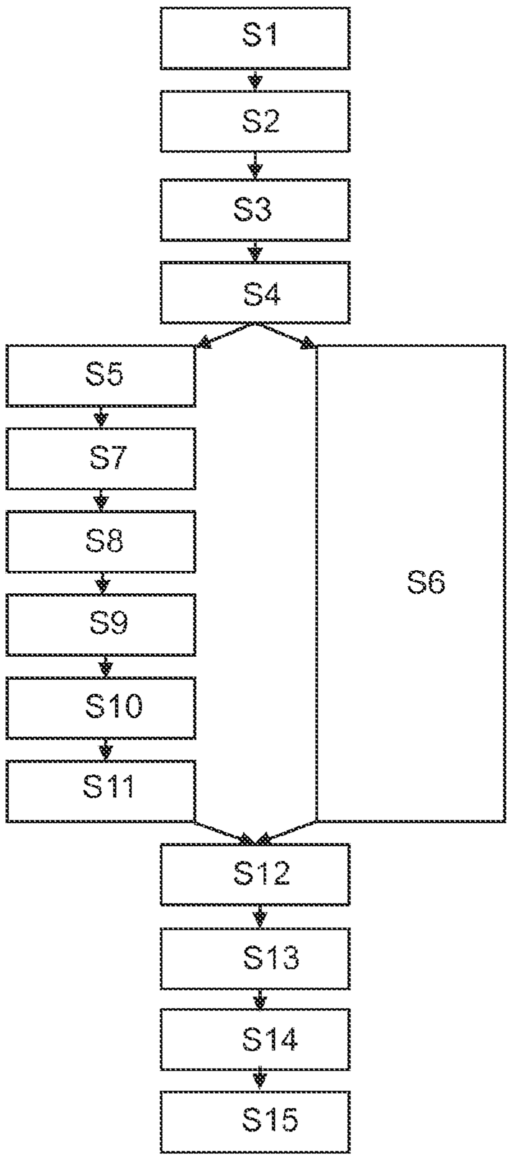
FIG. 12 schematically shows a method for manufacturing a dental prosthesis according to an exemplary embodiment of the invention.

FIG. 12 schematically illustrates an exemplary embodiment of a method for manufacturing a dental prosthesis according to the invention.

According to this example, the method includes:

- a step S1 of digitally designing the dental prosthesis model to be made on the basis of the replica model of a patient's teeth 1, as illustrated in FIG. 1;
- a step S2, in which the positioning member model 8 is digitally designed in the teeth replica model 1;
- a step S3 of parallelising the teeth replica model 1, in which undercut zones are filled in digitally;
- a step S4 of generating the jaw portion model 2, as illustrated in FIGS. 3A and 3B, including the teeth replica model 1 and the model of the dental prosthesis assembled to said teeth replica model 1;
- a step S5 involves the manufacturing of the jaw portion 20 on the basis of the jaw portion model 2 including a positioning member 28, for example by additive manufacturing;
- a step S6 involves the manufacturing of a teeth replica 10 on the basis of the teeth replica model 1 including a positioning member 18, for example by additive manufacturing;
- a step S7, as illustrated in FIG. 4, of positioning the jaw portion 20 on a shell 32 of a shell mould 30 by interaction of the positioning member 28 of the jaw portion 20 with the complementary positioning member 36 arranged in said shell 32;
- once the jaw portion 20 is positioned on the shell 32, the shell mould 30 is closed during a step S8, illustrated by FIG. 5;
- a step S9 of creating an imprint 39 of the jaw portion is thus carried out 20 by injection of a material into the shell mould 30. This step gives rise to the formation of an imprint 39 of the jaw portion;
- a step S10 of piercing a supply channel opening into the imprint 39;
- a step S11 of positioning at least one artificial tooth in the imprint of the jaw portion 20, as illustrated in FIG. 7;
- a step S12, shown for example by FIG. 8, of positioning the teeth replica 10 on the shell 32 of the shell mould 30 by interaction of the positioning member 18 of the teeth replica 10 with the complementary positioning member 36 of the shell 32;
- a step S13 of positioning a stellite chassis 44 on the teeth replica 10, when a partial dental prosthesis is involved.
- a step S14, shown for example by FIG. 9, of positioning the teeth replica 10 in the imprint 39 in which at least one artificial tooth 42 is positioned;
- a step S15, illustrated for example in FIG. 10, of casting a filling material 46 in a residual volume defined by the imprint 39, the at least one artificial tooth 42 and the teeth replica 10.

The invention claimed is:

1. Method for manufacturing a dental prosthesis, said method comprising:

- digitally designing a dental prosthesis model to be made from a replica model of a patient's teeth;
- generating a jaw portion model including the teeth replica model and the model of the dental prosthesis assembled to said teeth replica model;
- digitally designing a positioning member model in the teeth replica model;
- manufacturing a jaw portion including a positioning member on the basis of the jaw portion model including a positioning member model;
- manufacturing a teeth replica including a positioning member on the basis of the teeth replica model including the positioning member model;
- positioning the jaw portion on a shell of a shell mold by interaction of the positioning member of the jaw portion with a complementary positioning member arranged in said shell;
- closing the shell mold;
- creating an imprint of the jaw portion by injection of a material into the shell mold;
- positioning at least one artificial tooth in the imprint of the jaw portion;
- positioning the teeth replica on the shell of the shell mold by interaction of the positioning member of the teeth replica with the complementary positioning member of the shell;

positioning the teeth replica in the imprint in which the at least one artificial tooth is positioned; and casting a filling material in a residual volume defined by the imprint, the at least one artificial tooth and the teeth replica.

2. The method according to claim 1, wherein the positioning member interacts according to a sliding link with the complementary positioning member arranged on the shell.

3. The method according to claim 2, wherein the step of manufacturing the teeth replica is preceded by a step of parallelization of the teeth replica model, in which undercut zones are filled in digitally.

4. The method according to claim 3, wherein the step of positioning the teeth replica in the imprint is preceded by a step of positioning a stellite chassis on the teeth replica.

5. The method according to claim 4, further including a step of piercing a supply channel opening into the imprint.

6. The method according to claim 5, wherein the step of manufacturing the jaw portion and/or the teeth replica is carried out by additive manufacturing.

7. The method according to claim 6, wherein the step of manufacturing the jaw portion and/or the teeth replica is carried out according to a method comprising a succession of additions of material by jets on a printing support, in successive layers, the material being solidified by photopolymerization after each jet.

8. The method according to claim 1, wherein the step of manufacturing the teeth replica is preceded by a step of parallelization of the teeth replica model, in which undercut zones are filled in digitally.

9. The method according to claim 1, wherein the step of positioning the teeth replica in the imprint is preceded by a step of positioning a stellite chassis on the teeth replica.

10. The method according to claim 1, further including a step of piercing a supply channel opening into the imprint.

11. The method according to claim 1, wherein the step of manufacturing the jaw portion and/or the teeth replica is carried out by additive manufacturing.

12. The method according to claim 11, wherein the step of manufacturing the jaw portion and/or the teeth replica is carried out according to a method comprising a succession of additions of material by jets on a printing support, in successive layers, the material being solidified by photopolymerization after each jet.

* * * * *